United States Patent [19]

Frost et al.

[11] 3,822,457

[45] July 9, 1974

[54] METHOD OF MAKING ROTATABLE MEMBER ASSEMBLY

[75] Inventors: Charles C. Frost, Kentwood; Siegfried K. Weis, Grand Rapids, both of Mich.

[73] Assignee: C. L. Frost & Sons, Inc., Grand Rapids, Mich.

[22] Filed: July 9, 1973

[21] Appl. No.: 377,443

Related U.S. Application Data

[62] Division of Ser. No. 199,983, Nov. 18, 1971, Pat. No. 3,789,683.

[52] U.S. Cl. ...... 29/159 R, 29/148.4 A, 113/116 W, 219/117, 219/119
[51] Int. Cl. ............................................. B21k 1/42
[58] Field of Search ................. 29/159 R, 148.4 A; 113/116 W, 116 D; 74/230.8; 219/78, 117, 119

[56] References Cited
UNITED STATES PATENTS

| | | | |
|---|---|---|---|
| 828,033 | 8/1906 | Lachman | 29/159 R |
| 904,540 | 11/1908 | Lachman | 29/159 R |
| 2,655,813 | 10/1953 | Howell | 29/159 R X |
| 2,955,884 | 10/1960 | Marshall | 29/159 R X |
| 3,172,195 | 3/1965 | Wentling | 29/159 |
| 3,324,735 | 6/1967 | Hanke | 74/230.8 X |
| 3,599,503 | 8/1971 | Schultz, Jr. | 29/159 R X |

*Primary Examiner*—Charles W. Lanham
*Assistant Examiner*—Victor A. DiPalma
*Attorney, Agent, or Firm*—Price, Heneveld, Huizenga & Cooper

[57] ABSTRACT

The present disclosure relates to a rotatable member assembly such as a pulley wheel, a sheave or drive pulley or the like fabricated from a pair of metal disks stamped from sheet metal stock and welded together in a novel manner. The disk members are each provided with an outer peripheral rim, a web portion having an annular laterally extending weld projection formed thereon, and a central hub-engaging section. To assemble the member, a bearing, bushing, or hub is positioned in the central hub-engaging section and the disks are placed together and subjected to heat and pressure at the web portion so that the weld projection of one of the disks fuses with the weld projection of the other disk to form an integral assembly.

3 Claims, 5 Drawing Figures

PATENTED JUL 9 1974 3,822,457

METHOD OF MAKING ROTATABLE MEMBER ASSEMBLY

CROSS REFERENCE TO RELATED APPLICATION

This is a division of application Ser. No. 199,983, filed Nov. 18, 1971, now U.S. Pat. No. 3,789,683, and entitled ROTATABLE MEMBER ASSEMBLY AND METHOD FOR MAKING SAME.

BACKGROUND OF THE INVENTION

Prior art rotatable members such as pulleys have been produced in a variety of ways. Rim-splitting techniques, die casting, spin forming, and the like have been utilized with varying degrees of success. The most economical method of producing such a member is perhaps the manufacturing technique in which a pair of stamped sheet metal disk members are positioned together and in which a hub member is riveted, staked, or welded in place. In some cases, the halves making up the member are further secured together in the web portion or in the spokes by rivets, spot welding, nuts and bolts, or other conventional fastening methods.

SUMMARY OF THE INVENTION

The present invention provides a rotatable member such as a pulley or sheave which is produced from a pair of stamped sheet metal disk members and which, when assembled, has strength and rigidity comparable to pulleys formed by die casting, rim splitting or the like. A ball bearing, bushing, collar, or other hub arrangement is captively held between the two halves forming the pulley as the pulley is welded together utilizing a novel projection welding technique.

Accordingly, it is a principal object of the present invention to provide a method of forming a bearing housing utilizing a novel projection welding technique.

It is another object of the present invention to provide a method of forming a rotatable member having an integral bearing housing.

It is a related object of the present invention to provide a sheet metal rotatable member utilizing projection welding techniques in a novel manner. These and other important objects and advantages of this invention will be readily understood by those skilled in the art upon reading the following specification with reference to the accompanying drawings in which.

DESCRIPTION OF THE PREFERRED EMBODIMENT

Figure 1:
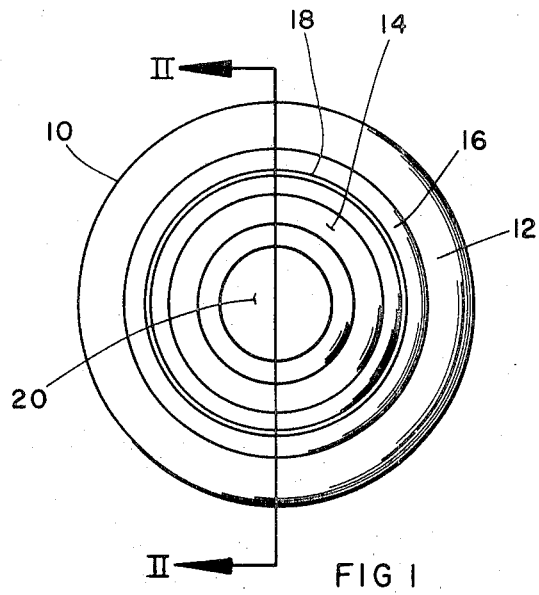
FIG. 1 is an elevational view of a disk from which the pulley of the present invention is produced.
Figure 2:
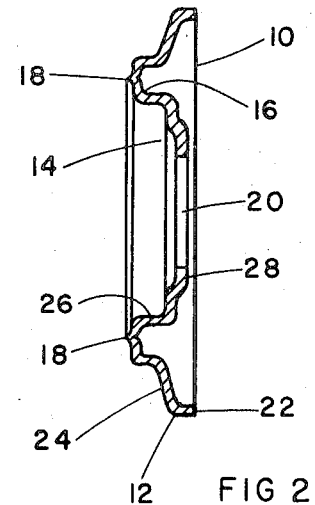
FIG. 2 is a cross-sectional view taken along the plane II—II of FIG. 1.

Referring now to the figures, and in particular, to FIGS. 1 and 2, a disk-like pulley blank 10 is illustrated. The blank may be formed from sheet metal stock by a simple stamping operation such as can be readily carried out on a punch press having a die suitable configuration. The formed disk is circular in shape and has an outer peripheral rim-forming edge 12, a central or hub-forming portion 14, and a web section 16 located between the rim 12 and the central hub-forming portion 14. Centrally located in the web section is an annular, outwardly extending weld projection 18. The central portion of the disk is provided with an opening 20. A pair of disks 10 positioned adjacent each other and fixed at the welding projection 18 will provide a pulley having a peripheral rim rotatable about an axis defined by the central opening 20.

Considering the web 16 as a reference point, the formed disk includes an outwardly extending, annular flange 22 and radially inwardly tapering side walls 24 forming the rim 12 which will form one side of a belt-receiving groove in the completed pulley as will be more fully described hereinafter.

The hub housing 14 is formed by an outwardly extending annular wall 26 which turns radially inwardly to form an outer wall 28 of the housing. The opening 20 is centrally located within the outer wall 28.

The annular weld projection 18 formed in the web 16 is generally centrally located within the annular web and extends outwardly from the web in the direction opposite to the wall and flange structure previously described. The weld projection may be formed during the stamping operation at the same time the disk is produced and extends a slight distance from the surface of the web. In one practical embodiment, a three-inch pulley is formed of 18 gauge cold rolled steel, the web is approximately eleven thirty-seconds of an inch wide, the wall projection extends outwardly approximately 0.015 inches and has a width of approximately 0.025 inches.

Figure 3:
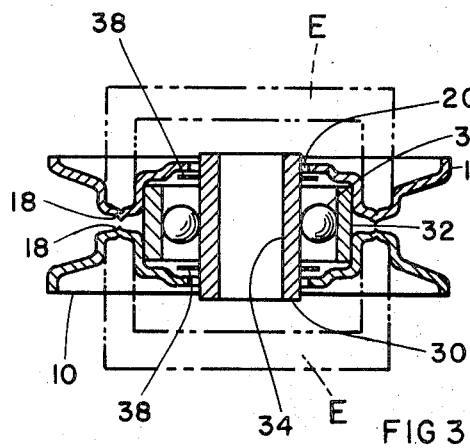
FIG. 3 is a cross-sectional view showing a pair of formed disks with a bearing positioned therebetween prior to welding of the disks together.

Referring now to FIG. 3, two individual disks 10 are shown positioned adjacent each other with the annular weld projection 18 of each disk in contact with each other. A ball bearing 30 is positioned within the hub housing 14. The bearing is of conventional construction having an outer race 32 and an inner race 34 separated by rolling elements 36. The inner race 34 may extend axially outwardly through the opening 20. A pair of bearing seals 38 are positioned about the inner race between the bearing 30 and the inner facing surfaces of walls 28. The seal extends radially outwardly from the inner race to cover the rolling elements and the outer race 32. The seal 38 serves to prevent the entrance of contaminating material into the bearing and also holds the bearing lubricant within the housing.

A pair of annular welding electrodes E and E' are positioned on each side of the pulley in contact with the web 16. The actual welding operation is then accomplished in a conventional manner, that is, by applying a force to the electrodes pressing the welding projections 18 into contact with each other. Electric current is simultaneously applied through the electrodes and passes through the weld projections 18 causing the weld projections to become heated to a fusing or welding temperature thereby fusing the web portions of each of the disks together.

Figure 4:
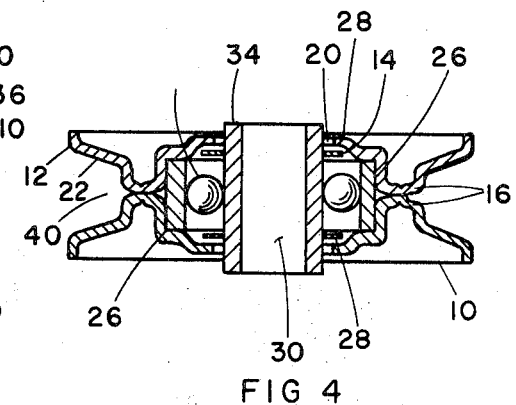
FIG. 4 is a cross-sectional view like FIG. 3 showing the assembled pulley with a bearing held therein.

As the pressure and current is applied to the welding electrodes the webs 16 are fused together and a completed pulley wheel as illustrated in FIG. 4 results. The bearing 30 is securely fixed between the hub housings 14 formed by the side walls 26 and outer walls 28. The web portions 16 are fused together and form integral assemblies connecting the two pulley disks together. The rims 12 and tapered side walls 24 cooperate with each other to form an outer peripheral belt-receivng groove 40.

Figure 5:
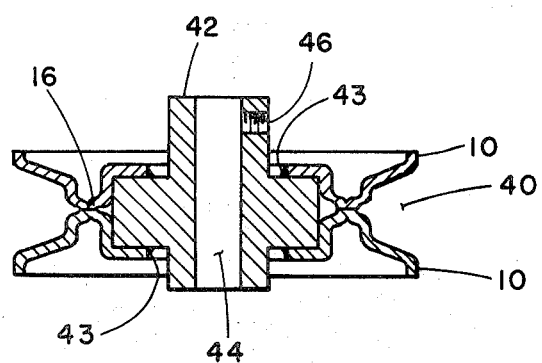
FIG. 5 is a cross-sectional view similar to FIG. 4 illustrating a bushing or other hub-forming member positioned between the fused-together disk members.

The idler pulley illustrated in FIG. 4 may be modified as shown in FIG. 5 for mounting on a shaft and for rotation therewith by placing a hub member, or bushing 42, between the pulley halves prior to welding. Preferably, the bushing is welded, brazed, or staked as indicated at 43 to the hub housing 14 to prevent relative movement therebetween. The bushing 42 may be provided with a finished axial bore 44 rotatable about a shaft upon which it is mounted or it may be provided with a drilled, tapped hole to receive a set screw (not shown) for securing the pulley to a shaft. Alternately, the hub or bushing 42 may be provided with a keyway, spline, or other desirable internal configuration as will become immediately obvious to those skilled in the art.

As contrasted to the prior art sheet metal pulleys wherein the halves are fixed together by rivets or a plurality of spot welds, the novel annular welding technique of the present invention completely about the diameter of the pulley at the web portion has many advantages. When the welding is accomplished as illustrated in FIG. 3, for example, the fairly large web surfaces in contact with each other tend to reduce or completely eliminate welding flash or splatter. Perfect alignment between the pulley halves is maintained as the cooperation between the bearing 30 with the side walls 26 of the housing 14 serve to align two halves with each other. The relatively inexpensive seals provided between the outer walls 28 and the bearing 30 eliminate the necessity of providing bearing having integral seals and shields.

In the spot-welded, or riveted pulley constructions of the prior art, bearing lubricants, because of the centrifugal force, will tend to flow outwardly beyond the web portion into the belt-receiving groove causing slippage of the belt and loss of efficiency. The annular welding construction of the present invention completely seals the pulley hub housing and forms a completely enclosed bearing lubricant chamber. The reduction in manufacturing costs is, of course, a significant aspect of this invention as the pulley halves and hub or bearing are completely assembled in one simple welding operation.

Other modifications, variations, and the many advantages of the present invention will be suggested to those skilled in the art without departing from the scope of the invention which is defined by the following claims.

The embodiments of the invention in which an exclusive property or privilege is claimed are defined as follows.

1. The method of producing a pulley wheel comprising the steps of: forming a pair of sheet metal disks, each said disk including an annular rim portion, an annular hub portion, a web portion connecting said rim and hub, and an annular transversely extending weld projection on said web portion; positioning a bearing in said hub portion of one of said pair of disks and positioning the other of said pair of disks adjacent said one of said disks to secure said bearing therebetween; placing a pair of cooperating annular welding electrodes on said web portion; and energizing said electrodes causing said annular weld projections on each of said web portions to be fused together.

2. The method of fabricating a bearing housing comprising the steps of:

forming a pair of sheet metal disks, each said disk including an outwardly extending hub portion having a side wall, a radially inwardly extending end wall having an opening therein, and an oppositely directed annular weld projection surrounding said hub portion;

positioning a bearing in said hub portion of one of said disks;

positioning the other of said pair of disks adjacent said one of said disks such that the hub portions of said disks cooperate to enclose said bearing; and fusing said annular weld projection of each of said disks together to form an integral housing about said bearing.

3. The method of fabricating a pulley wheel comprising the steps of:

forming a pair of sheet metal disks, each said disk including an annular rim portion, a hub portion, a web portion connecting said rim and said hub and a transversely extending annular weld projection on at least one of said disks surrounding said hub portion positioning a bearing in said hub portion of one of said disks;

positioning the other of said disks adjacent said one of said disks to cooperatively enclose said bearing in said hub portions;

placing a pair of welding electrodes on said web portions of said disks; and fusing said annular weld projection of one of said disks to the web portion of the other of said disks to form an integral housing about said bearing.

* * * * *